Dec. 28, 1965   J. A. WINKER   3,226,060
CONTROLLED EXCESS MATERIAL BALLOON
Filed Feb. 28, 1964   2 Sheets-Sheet 1

INVENTOR.
James A. Winker
BY
Hill, Sherman, Meroni, Gross & Simpson
ATTORNEYS

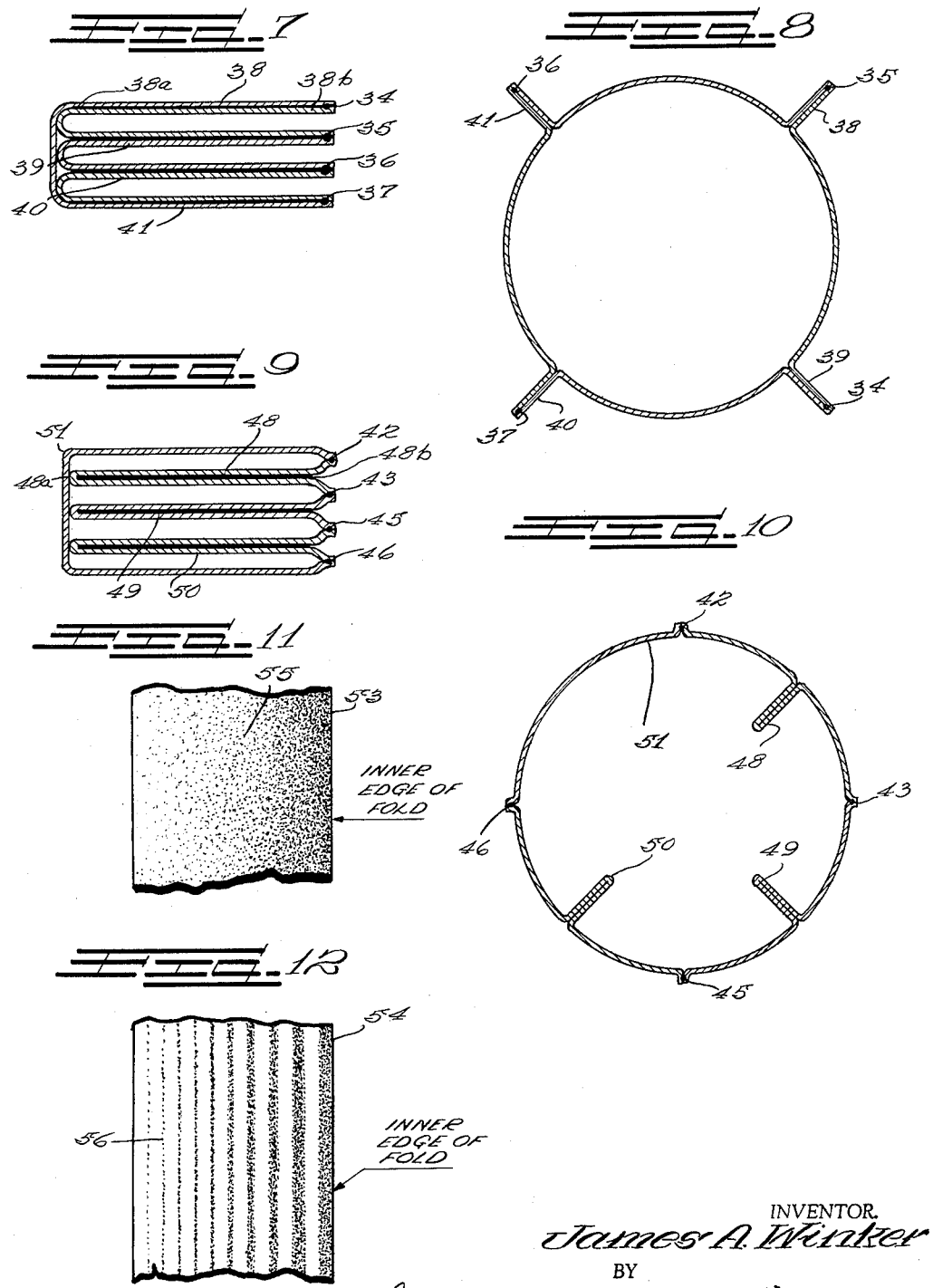

United States Patent Office 3,226,060
Patented Dec. 28, 1965

3,226,060
CONTROLLED EXCESS MATERIAL BALLOON
James A. Winker, Sioux Falls, S. Dak., assignor to Raven Industries Inc., Sioux Falls, S. Dak., a corporation of South Dakota
Filed Feb. 28, 1964, Ser. No. 348,109
5 Claims. (Cl. 244—31)

The present invention relates to improvements in load-carrying high altitude balloons and particularly to an improved envelope structure and method of making the envelope.

The present invention is used primarily with balloons formed of lightweight flexible gas barrier material such as polyethylene or other plastics wherein the material is formed in gores with the gores being attached to each other along seams to form the balloon envelope. An optimum design for a load-carrying balloon is one in which all stresses (at least vertical stresses) are uniform and equal at all points on the balloon skin. Non-uniformity in design which might produce stress concentrations would necessarily be avoided. This carried to its ultimate would mean elimination of any discreet reinforcing bands and all accessories. It would also mean that the material itself would have to be variable in tensile strength, and in order to accomplish this would have to be variable in thickness along its gore length. It would have to be a ductile, almost amorphous envelope whose shape is determined solely by the internal and external forces acting upon it.

In approaching a balloon with uniform vertical stresses practical approximations have employed the conventional polyethylene cylinder or semi-tailored balloons. These of course, do not have nearly the strength required to carry the heavy payloads being flown today. In fact, a size limitation exists for which the gas bubble cannot even support the balloon weight. The cylindrical or semi-tailored balloons are usually constructed tapeless and these balloons work because an adequate amount of material is contained throughout the gore length to support the loads involved. This is accomplished by including material in the gores extra to the requirements of the inflated contour in the upper and lower areas. As will be recognized by those skilled in the art, the balloon envelope forms a smooth contour at the equator and the extra material forms billows toward the ends of the balloon above and below the equator. The extreme example of a tapeless balloon is a cylinder balloon in which the originally formed envelope has a constant gore width from bottom to top and is in the shape of a cylinder with the ends of the cylinder gathered together. A cylinder balloon when floating can withstand loadings equal to the tensile strength of the material times its cross-sectional area. For example, for a six million cubic foot, one-half mil cylinder balloon, the strength of the material is approximately 5000 pounds. After subtracting the balloon weight (on the order of 700 pounds) and considering the cone angle, this fully inflated balloon could support a payload of approximately 2700 pounds.

The limiting factor, however, is that at launch, the same lifting force must be restrained in a bubble about 47 feet in diameter. Though the full circumference of the 750 feet of material exists in this area only about 148 feet (bubble circumference) is operative. With the 3400 pounds of lift (2700 pounds load plus 700 pounds balloon), the stress in the balloon film would be 3900 p.s.i. or about 6 times the normally allowed stress level. The bubble necessary to lift just the 700 pound balloon is approximately 28 feet in diameter and this bubble material would be stressed to 1400 p.s.i., well above the accepted limit.

The only way to get a tapeless balloon to have a greater capacity is to get more working material in the initial bubble. Increasing the film thickness is not an answer, as one and two mil, 6 million cubic foot balloons supporting themselves would develop stresses of 1250 p.s.i. and 900 p.s.i. respectively, and of course their altitude capabilities would be drastically low.

One approach which has been considered is placing a cap just in the bubble area which would increase the amount of film being stressed at a modest increase in balloon weight. For example, a one-half mil cap could be added to the six million cubic foot balloon which would double the amount of film working. In a practical case it would be assumed that the balloon would be partially tailored rather than cylindrical and therefore an approximate balloon weight would exist of under 700 pounds, for example on the order of 550 pounds. At normal allowable stress levels this balloon could support about 1000 pounds or 450 pounds in addition to itself. This is favorable in comparison with experiences with past loads on ½ mil tapeless 6 million cubic foot balloons. Loads up to 300 pounds have been carried, but at dangerous stress levels (gross lift 885 pounds). Heavier caps may be considered, but the problems of sealing and stress transition at the boundary will be greatly compounded.

A second major problem exists in the balloon construction aside from lift capability. As above mentioned, the gas contained in the balloon at launch fills only a small bubble at the crown of the balloon. The vast area of uninflated balloon skin drapes together in a stem or rope from the bubble to the balloon base. This rope of material arranges itself almost completely at random with the result that the loading and stress is very non-uniform with respect to the balloon axis. Some regions will be highly stressed while others may have no stress at all with the low stress resulting at the location where the rope of material has gathered and the high stress resulting at the other side of the balloon where a single layer of material exists. The range of stresses and the maximum stress in a particular balloon cannot be calculated or predicted because of the randomness of the drape pattern and the location of the drape can be located only after the balloon is inflated for launching. Certainly, in some cases the stress exceeds material strengths resulting in balloon failure. Most balloon failures occur at mid-altitudes, during ascent, and it is suspected that this unequal stressing is the second most important contributing cause (after low temperature effects).

It is accordingly an object of the present invention to provide a balloon construction and method of making a balloon wherein a tapeless balloon envelope is provided which is capable of obtaining substantially uniform stress on the balloon material for the full length of the balloon without encountering the disadvantages of cylindrical or tailored balloons of the type heretofore constructed.

A further object of the invention is to provide an improved structure and method of making wherein adequate balloon material is provided for accommodating full inflation at high altitudes and for accommodating increase in the size of gas bubble as higher altitudes are reached and yet wherein the excess material is controlled and maintained in folds reducing the chance of encountering concentrations of stress or excessive stresses in one location on the material.

A still further object of the invention is to provide an improved balloon structure and method of making wherein adequate balloon material is provided for sustaining vertical stresses and for accommodating increase in the volume of the balloon and such adequate material is maintained automatically uniformly distributed around the circumference of the balloon with increase in size of the gas bubble during ascension of the balloon.

Yet another object of the invention is to provide an improved balloon envelope structure which has adequate material for carrying the vertical load on the balloon which material is in excess of that required for the gas bubble within the balloon and wherein the excess material is maintained in folds which resist separation with increased force as they become smaller so that the folds will separate uniformly and remain of uniform size around the circumference of the balloon.

In accordance with a feature of the invention the balloon includes, in one form, a balloon envelope of lightweight flexible material with a plurality of vertical folds in the balloon envelope with the facing layers of the material of each fold joined by a separable bond which has an increasing strength from the exposed edge of the fold to the inner edge so that each of the folds will be progressively separated due to the increase in volume of lifting gas within the balloon envelope but the resistance to separation will increase so that the folds will remain of substantially uniform size and evenly distributed around the balloon circumference as the internal gas bubble increases in size.

Other objects, advantages and features will become more apparent with the teaching of the principles of the invention in connection with the disclosure of the preferred embodiments thereof in the specification, claims and drawings, in which:

FIGURES 7 and 9 are schematic sectional views showing different arrangements of the balloon material before inflation;

FIGURES 8 and 10 are schematic horizontal sectional illustrations of the balloons of FIGURES 7 and 9 respectively after they are in flight;

FIGURE 11 is a plan view showing the distribution of adhesive between the layers of a balloon material fold; and FIGURE 12 is a plan view showing the arrangement of a heat seal bond between layers of a fold of balloon material.

As shown on the drawings:

Figure 1:
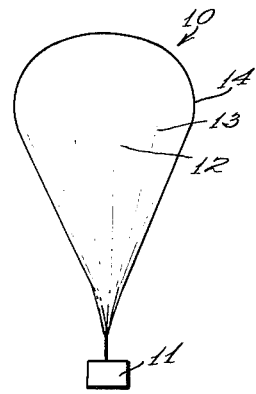
FIGURE 1 is a perspective view of a balloon in flight with the gas bubble fully inflated as at high altitudes.
Figure 2:
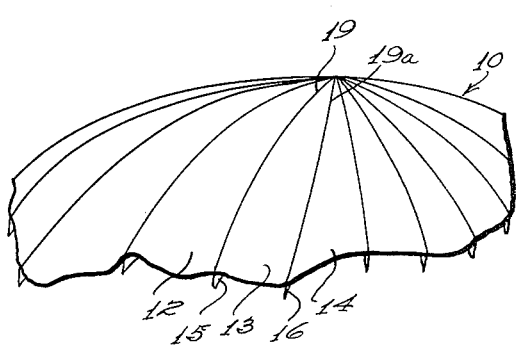
FIGURE 2 is a fragmentary elevational view of the upper end of a balloon constructed in accordance with the principles of the present invention.

FIGURE 1 illustrates a balloon 10 after it is ascended to floating altitude, carrying a payload 11. The balloon is formed in vertical gores 12, 13 and 14 which, as illustrated in FIGURE 2, are attached to each other by seams 15 and 16.

The balloon material is of a conventional type such as lightweight polyethylene on the order of 1 mil in thickness and the seams are either formed by cement or heat sealed to join the gas barrier material of the gores and form gas tight seams.

The gores are of a shape so as to provide adequate material above and below the balloon equator for supporting the vertical stresses on the balloon. A convenient shape of gores is rectangular shape with the seams following down the side edges of the gores. The gores can be tailored, being their full width at the balloon equator and tapered inwardly somewhat slightly at the ends providing just enough material at the ends to carry the vertical stresses which will be encountered. With tailored gores, again in accordance with the principles of the present invention, the seams are formed at the edges of the gores. A tailored gore is usually selected having a width at a location which will be at the balloon equator adequate to provide for maximum allowable vertical stress without exceeding the strength of the material and the ends of the gore are reduced to a width which will carry the vertical load to be encountered and sustain desired maximum vertical stress.

In the conventional tailored tapeless balloon there is a great deal of material in excess of the bubble circumference. In a typical case the circumference of the bubble at launching might by 90 feet whereas the balloon contains 180 feet of material. The excess frequently comes together at one side forming a rope as shown at 17 for the balloon 18 in FIGURE 3. This rope forms half of the material carrying the load and the load is physically off at one side causing unsymmetrical stress.

Figure 3:
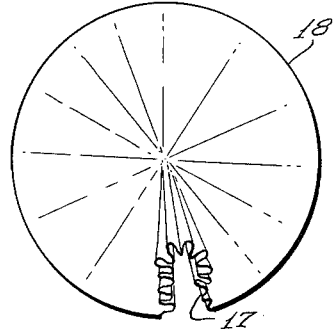
FIGURE 3 is a somewhat schematic top plan view illustrating the difficulties encountered in inflation of balloons of the type heretofore available.
Figure 4:
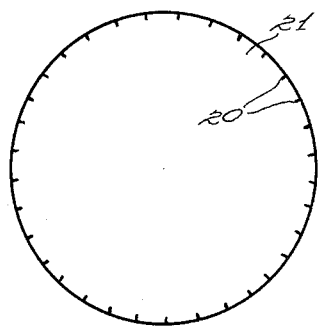
FIGURE 4 is a somewhat schematic horizontal sectional view taken through the balloon showing the arrangement of material around a balloon of the type constructed in accordance with the present invention.

In accordance with the principles of the present invention a plurality of vertical folds are formed in the balloon material with the folds shown at 19 and 19a in FIGURE 2 for the balloon 10, and shown at 20 in FIGURE 4 for the balloon 21. The folds may either project inwardly on the balloon as shown in FIGURE 2, or may be on the outer surface of the balloon as shown in FIGURE 8. In either arrangement the folds control the excess material maintaining it uniformly distributed around the balloon circumference so that the rope effect which is illustrated at FIGURE 3 cannot occur.

The facing layers of material of each fold are adhered lightly together from exposed edges of the fold to the closed doubled edge of the fold with a bond which is yieldable or separable and is preferably of gradually increasing strength from the exposed edges of the fold to the inner edge. The layers can thus peel apart as the bubble of gas expands. The bond strength will increase such as in the range of 5% of the material strength to 30–40%. The seams between the adjoining gores are of full strength which in a typical heat seal construction is 80 to 90% of material strength. The bond may be formed in various ways such as by placing an adhesive between the layers or a heat seal.

Figures 5, 6:
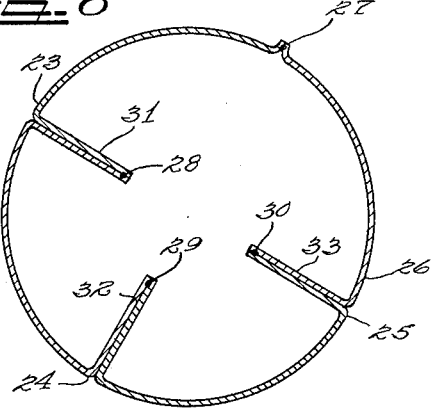
FIGURE 5 is a schematic sectional view taken through a folded balloon before inflation.
FIGURE 6 is a schematic horizontal sectional view showing the material of the balloon formed as shown in FIGURE 5 after it is in flight.

FIGURE 5 illustrates one manner in which the gores may be folded and bonded. For convenience of illustration, in FIGURES 5 through 10 a fewer number of gores than that usually used will be shown since the principles can be illustrated and can be employed with gores of varying numbers.

As shown in FIGURE 5, a balloon envelope having gores 23, 24, 25 and 26 is shown. This balloon envelope is shown in its deployed state in FIGURE 6.

The gores are joined by seams 27, 28, 29 and 30. The gores are formed in a plurality of folds 31, 32 and 33. The facing layers of material in the folds are bonded together, preferably with a bond of increasing strength from the outer exposed edge 31a to the inner edge 31b.

As constructed this balloon has virtually no volume. For inflation, gas would be introduced into the gore of the balloon and the gas pressure would cause the material to peel apart at the folds. Peeling would be approximately uniform on each gore because of the progressive strength of the bond. All of the excess material will remain uniformly distributed around the balloon at any stage of inflation or expansion of the lifting gas. The configuration of the bubble and the amount of peeling would be determined by the buoyant forces of the gas. This will conform approximately to the "natural shape" for partially inflated balloons and also for the fully inflated condition.

FIGURE 6 shows the manner in which the material tends to spread out in the partially inflated stage. The bonds at 31, 32 and 33 progressively separate and separate only so far as caused by the increase in pressure of the lifting gas as it expands, and the remaining material remains under control.

In the arrangement of FIGURE 7 a balloon envelope is shown with gores having seams at 34, 35, 36 and 37. The gores are folded with layers being bonded together at 38, 39, 40 and 41. The bonds are formed so that they increase in strength from the outer or exposed edge 38a to the inner edge 38b.

FIGURE 8 shows the balloon envelope of FIGURE 7 as it is deployed and the layers are peeled apart at the folds when the bonds yield or break. Since the bonds are only a fraction of the strength of the material they will peel apart without unduly stressing the material.

In the arrangement of FIGURE 5 the balloon envelope can be completely formed with its seams and the bonds added later. In the arrangement of FIGURE 7, since the bonds are within the balloon, at least one seam must be left open while the others are formed. In the arrangement of FIGURE 6 stresses on the balloon envelope which tend to peel apart are imposed on the seam 27. In the arrangement of FIGURE 8 none of the seams encounter the peeling stress.

In the arrangement of FIGURE 9 gores are joined together by seams 42, 43, 45 and 46. Bonds 48, 49 and 50 are formed between layers, but the folds involving the gore 51 are not bonded. This leaves the gore 51 unbonded to expand in the manner shown in FIGURE 10 when the balloon is deployed. As above stated, for convenience the balloons of FIGURES 5 through 10 are shown with fewer gores than actually used, and the gores usually will be of equal width although the outer gore is shown longer in the illustration.

With the arrangements of FIGURES 5 and 9 the bonds can conveniently be formed with an adhesive being placed between the folds after the balloon is formed. If the bond is formed by a heat seal which may involve pressures on the opposing surfaces of the layers of the material, the arrangement of FIGURE 7 is well adapted to this type of bond.

FIGURE 11 shows the bonded surface of a layer 53 of material, with the upper layer being removed, and shows the pattern of the adhesive 55 on the surface. As illustrated in the drawing the adhesive increases in strength from the outer edge of the fold to the inner edge. This may be done by increasing the density of the adhesive, or by using different adhesives which have increased strength, applying the adhesives in different stripes progressing from the outer to the inner edge of the fold.

FIGURE 12 illustrates the bond which is used on a layer 54 formed by a heat seal. The heat seal 56 may in stripes of increasing width or increasing strength as they progress inwardly from the outer edge to the inner edge of the fold. It is also contemplated that other types of bonds may be employed and the increase in strength of bonds may be obtained by various ways such as increase in density or frequency of the bonding areas.

In operation, as a bubble of gas is first forced into the balloon before launching a minor separation of the bonds will occur to accommodate the original bubble, and as the balloon is launched and the bubble increases in size the layers will progressively separate or peel apart as the size of the bubble increases. The bubble will then be free to expand so that the balloon will approximate a "natural shape," which shape is known and recognized by those versed in the art.

The adhesive pattern between each of the folds is preferably arranged with increasing bonding strength from the exposed edges of the fold to the inner edge and this is well adapted to relatively rapid and convenient manufacturing practices. However, in some instances it may be desirable to pattern the adhesive arrangement so that the expansion of the bubble of gas is precalculated and the adhesive strength progresses as a function of the known progressive peeling of the layers which will occur to accommodate the natural shape of the gas bubble.

Thus it will be seen that I have provided a balloon structure and method of making the structure and of controlling the excess material in a balloon which meets the objectives, advantages and features above set forth. The structure does not interfere with the normal function of the balloon and substantially increases the size of payload which can be carried aloft since optimum utilization of the available strength of the balloon material is achieved.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A balloon structure comprising in combination,
    a balloon envelope formed of lightweight flexible material,
    a plurality of vertical folds in the envelope with the facing layers of material of each fold joined by a separable bond which has an increasing strength from the exposed to the inner edge of the fold so that the folds will progressively and uniformly separate with respect to each other due to the increase in volume of lifting gas within the envelope,
    and means for supporting a payload on the balloon envelope.

2. A balloon structure comprising in combination,
    a balloon envelope of lightweight flexible material,
    a plurality of vertical folds in the balloon envelope,
    a yieldable adhesive between facing layers of material of each fold having a strength increasing from the exposed to the inner edge of the fold so that the folds will progressively separate due to the increase in volume of lifting gas within the balloon and the folds will remain of substantially equal size with respect to each other as they diminish due to increase in volume of gas,
    and means supporting a payload on the balloon envelope.

3. A balloon structure comprising in combination,
    a balloon envelope formed of lightweight flexible material,
    a plurality of vertical folds in the envelope with the facing layers of material of each fold being heat sealed together with seals which progress in strength from the exposed edge of the fold to the inner edge so that the folds progressively and uniformly separate with respect to each other with increase in volume of lifting gas within the envelope,
    and means on the lower end of the envelope for supporting a payload on the balloon.

4. A balloon structure comprising in combination,
    a balloon envelope formed of a plurality of vertical gores of lightweight flexible material joined by vertical seams,
    a plurality of said gores being folded intermediate their edges with a seam at the outer edge at each side of a fold,
    an adhesive layer of increasing strength releasably bonding the adjacent layers of each fold together so that the layers will separate progressively and uniformly with respect to each other with increase in volume of lifting gas within the balloon,
    and means on the envelope for supporting a payload therefrom.

5. A balloon structure comprising in combination,
a balloon envelope formed of lightweight flexible material,
a plurality of vertical folds in the envelope with the facing layers of material of each fold joined by a separable bond which has a progressively increasing strength of 5% of the material strength from its exposed edge to 30% of the material strength at the inner edge of the fold so that the folded material will remain folded until the lifting gas within the balloon forces the fold apart and the folds will remain of substantial equal size as they each are separated,
and means for supporting a payload on the balloon.

References Cited by the Examiner
UNITED STATES PATENTS

| | | | |
|---|---|---|---|
| 2,858,090 | 10/1958 | Winzen et al. | 244—31 |
| 3,113,748 | 12/1963 | Struble | 244—31 |

MILTON BUCHLER, *Primary Examiner.*
FERGUS S. MIDDLETON, *Examiner.*